(12) United States Patent
Hodge

(10) Patent No.: US 11,536,547 B2
(45) Date of Patent: Dec. 27, 2022

(54) MOBILE CORRECTIONAL FACILITY ROBOTS

(71) Applicant: **Global Tel*Link Corporation**, Reston, VA (US)

(72) Inventor: Stephen Hodge, Aubrey, TX (US)

(73) Assignee: **Global Tel*Link Corporation**, Reston, VA (US)

( * ) Notice: Subject to any disclaimer, the term of this patent is extended or adjusted under 35 U.S.C. 154(b) by 398 days.

(21) Appl. No.: 16/887,786

(22) Filed: May 29, 2020

(65) Prior Publication Data

US 2020/0292288 A1    Sep. 17, 2020

Related U.S. Application Data

(63) Continuation of application No. 15/491,728, filed on Apr. 19, 2017, now Pat. No. 10,690,466.

(51) Int. Cl.
| | |
|---|---|
| *G06F 17/00* | (2019.01) |
| *F42B 12/74* | (2006.01) |
| *F41H 7/00* | (2006.01) |
| *G05D 1/02* | (2020.01) |
| *F41H 13/00* | (2006.01) |
| *F41B 15/02* | (2006.01) |
| *F41H 9/04* | (2006.01) |

(52) U.S. Cl.
CPC ............ *F42B 12/745* (2013.01); *F41H 7/005* (2013.01); *G05D 1/0282* (2013.01); *F41B 15/02* (2013.01); *F41H 9/04* (2013.01); *F41H 13/0012* (2013.01); *G05D 2201/0209* (2013.01)

(58) Field of Classification Search
CPC .......... F42B 12/745; F41H 7/005; F41H 9/04; F41H 13/0012; G05D 1/0282; G05D 2201/0209; F41B 15/02
USPC ........................................................ 700/248
See application file for complete search history.

(56) References Cited

U.S. PATENT DOCUMENTS

| | | | |
|---|---|---|---|
| 6,130,705 A | 10/2000 | Lareau | |
| 7,106,843 B1 * | 9/2006 | Gainsboro | .......... H04M 3/2281 455/411 |
| 7,555,383 B2 | 6/2009 | Siegel | |

(Continued)

OTHER PUBLICATIONS

International Search Report and Written Opinion directed to related International Patent Application No. PCT/US2016/067252, dated Mar. 16, 2017; 14 pages.

(Continued)

*Primary Examiner* — Ronnie M Mancho
(74) *Attorney, Agent, or Firm* — Sterne, Kessler, Goldstein & Fox P.L.L.C.

(57) ABSTRACT

The present disclosure is directed to mobile correctional facility robots and systems and methods for coordinating mobile correctional facility robots to perform various tasks in a correctional facility. The mobile correctional facility robots can be used to perform many of the tasks traditionally assigned to correctional facility guards to help reduce the number of guards needed in any given correctional facility. When cooperation is employed among multiple mobile correctional facility robots to execute tasks, a central controller can be used to coordinate the efforts of the multiple robots to improve the performance of the overall system of robots as compared to the performance of the robots when working in uncoordinated effort to execute the tasks.

20 Claims, 5 Drawing Sheets

(56) References Cited

U.S. PATENT DOCUMENTS

| | | |
|---|---|---|
| 8,229,163 B2 | 7/2012 | Coleman et al. |
| 8,706,914 B2 * | 4/2014 | Duchesneau ........... H04L 63/20 709/250 |
| 8,948,935 B1 | 2/2015 | Peeters et al. |
| 9,387,928 B1 | 7/2016 | Gentry et al. |
| 9,442,485 B1 | 9/2016 | McDermott et al. |
| 9,471,059 B1 | 10/2016 | Wilkins |
| 9,607,219 B2 | 3/2017 | Greveson et al. |
| 9,645,582 B2 | 5/2017 | Shue |
| 9,874,308 B2 | 1/2018 | Saika et al. |
| 2004/0030449 A1 | 2/2004 | Solomon |
| 2007/0112461 A1 | 5/2007 | Zini et al. |
| 2008/0043993 A1 | 2/2008 | Johnson |
| 2009/0076823 A1 | 3/2009 | Collins |
| 2009/0080715 A1 | 3/2009 | van Beek et al. |
| 2009/0216910 A1 * | 8/2009 | Duchesneau ......... G06F 9/5072 709/250 |
| 2010/0034424 A1 | 2/2010 | Goossen |
| 2010/0299761 A1 | 11/2010 | Shapiro |
| 2011/0017863 A1 | 1/2011 | Goossen |
| 2012/0165976 A1 | 6/2012 | Cotner |
| 2013/0054010 A1 | 2/2013 | Holman et al. |
| 2013/0110281 A1 | 5/2013 | Jones et al. |
| 2013/0197718 A1 * | 8/2013 | Lee ..................... G05D 1/0038 701/28 |
| 2013/0279668 A1 | 10/2013 | Rokosky et al. |
| 2014/0018979 A1 | 1/2014 | Goossen et al. |
| 2014/0140575 A1 | 5/2014 | Wolf |
| 2014/0152422 A1 | 6/2014 | Breed |
| 2014/0277691 A1 | 9/2014 | Jacobus et al. |
| 2015/0190925 A1 | 7/2015 | Hoffman et al. |
| 2015/0215254 A1 | 7/2015 | Bennett |
| 2015/0360365 A1 | 12/2015 | Fudaba et al. |
| 2016/0063987 A1 | 3/2016 | Xu et al. |
| 2016/0253889 A1 | 9/2016 | Keyton |
| 2017/0053169 A1 | 2/2017 | Cuban |
| 2017/0092109 A1 | 3/2017 | Trundle et al. |
| 2017/0126691 A1 | 5/2017 | Arcese et al. |
| 2017/0147976 A1 | 5/2017 | Koch et al. |
| 2017/0177925 A1 | 6/2017 | Volkart |
| 2017/0225336 A1 * | 8/2017 | Deyle ..................... B25J 5/007 |
| 2018/0304465 A1 | 10/2018 | Hodge |

OTHER PUBLICATIONS

International Search Report and Written Opinion directed to related International Patent Application No. PCT/US2018/028354, dated Jul. 9, 2018; 16 pages.

International Search Report and Written Opinion directed to related International Patent Application No. PCT/US2018/027146, dated Jun. 28, 2018; 8 pages.

* cited by examiner

US 11,536,547 B2

MOBILE CORRECTIONAL FACILITY ROBOTS

CROSS REFERENCE TO RELATED APPLICATION

This application is a continuation of U.S. Nonprovisional patent application Ser. No. 15/491,728, filed on Apr. 19, 2017, titled "Mobile Correctional Facility Robots," and the contents of which are hereby incorporated herein by reference in its entirety.

TECHNICAL FIELD

This application relates generally to mobile robots for correctional facilities, including a system and method for coordinating mobile robots for correctional facilities.

BACKGROUND

A correctional facility is a facility in which inmates are confined and many of their freedoms restricted. Typically, a government institution confines inmates to correctional facilities for a specified period of time after the inmates have been found guilty of committing a crime.

Correctional facilities in the United States and in other areas abroad are often either overcrowded with inmates or understaffed with guards due to cost constraints. A more succinct way of characterizing the correctional facility situation in the United States and in other areas abroad is that the ratio of inmates to guards in many correctional facilities is often too high. As a result, guards are unable to appropriately monitor inmate activity and respond to events requiring their attention, which endangers not only the guards and inmates at these correctional facilities, but also the general public as well. Also, a substantial amount of the total funds available to correctional facilities is spent on guards, leaving little money left over to pay for programs to reduce recidivism, which only further exacerbates the problem of inmate overcrowding.

In addition, even assuming additional funds are made available to correctional facilities to increase the number of guards to perform inmate monitoring, studies have shown that humans are often ill-suited to perform routine monitoring through surveillance equipment, such as video cameras. This is because of the rote nature of monitoring surveillance equipment for some event of interest that may only infrequently occur.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

The present disclosure will be described with reference to the accompanying drawings. The drawing in which an element first appears is typically indicated by the leftmost digit(s) in the corresponding reference number.

DETAILED DESCRIPTION

Figure 1:
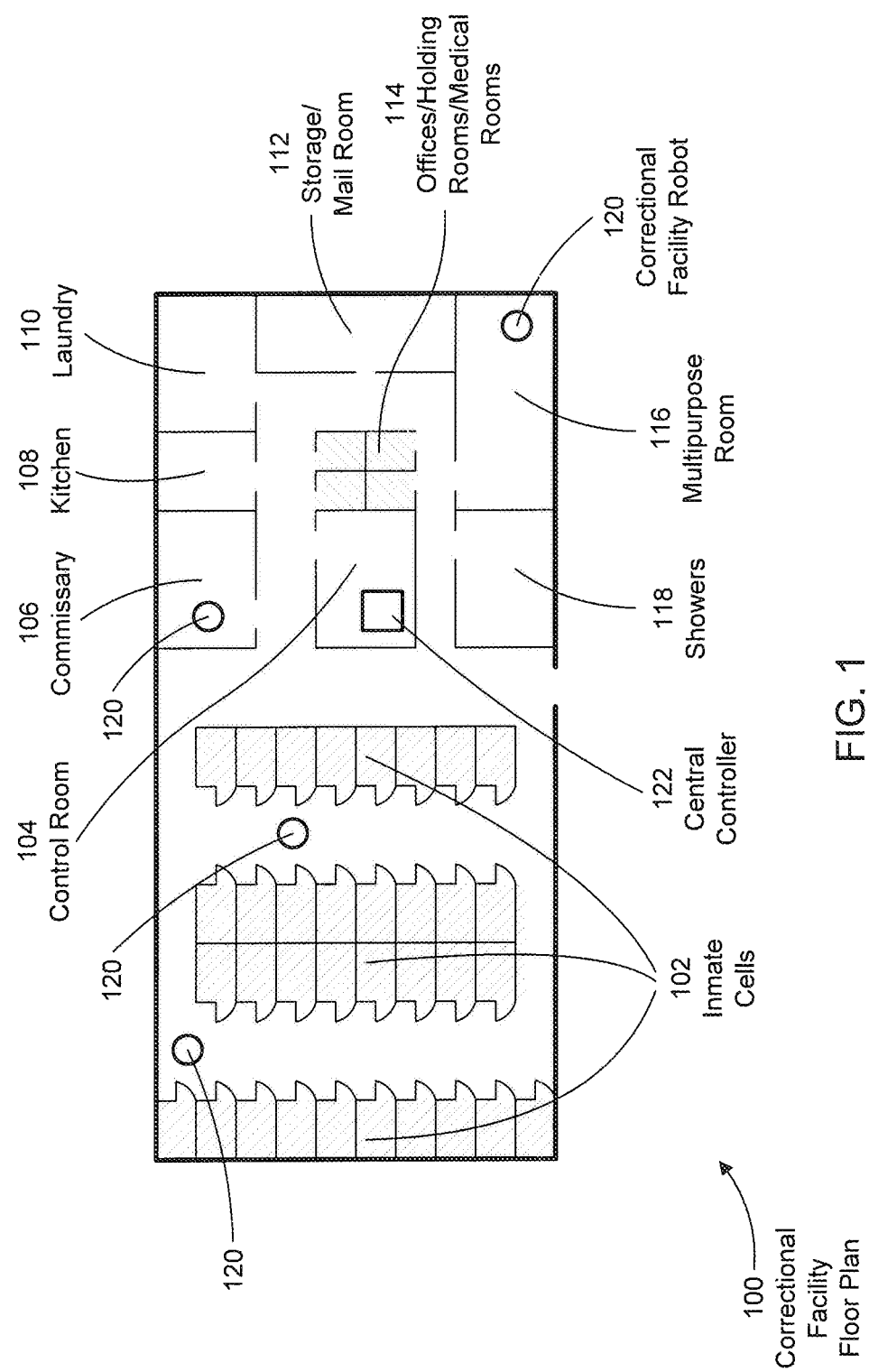
FIG. 1 illustrates an example correctional facility floor plan and mobile correctional facility robots operating in the correctional facility in accordance with embodiments of the present disclosure.

In the following description, numerous specific details are set forth in order to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It will be apparent to persons skilled in the relevant art(s) that various elements and features of the present disclosure, as described herein, can be implemented in hardware using analog and/or digital circuits, in software, through the execution of instructions by one or more general purpose or special-purpose processors, or as a combination of hardware and software.

1. Overview

The present disclosure is directed to mobile correctional facility robots and systems and methods for coordinating mobile correctional facility robots to perform various tasks in a correctional facility. The mobile correctional facility robots can be used to perform many of the tasks traditionally assigned to correctional facility guards to help reduce the number of guards needed in any given correctional facility.

Several types of mobile correctional facility robots with different capabilities and physical characteristics can be used, including a service robot and an enforcement robot. Each type of robot can work independently to execute a task, work together with other robots of the same type to execute a task, and/or work together with other robots of the same and differing types to execute a task.

When cooperation is employed among multiple mobile correctional facility robots to execute tasks, a central controller can be used to coordinate the efforts of the multiple robots to improve the performance of the overall system of robots as compared to the performance of the robots when working in uncoordinated effort to execute the tasks.

In one embodiment, a service robot is configured to perform a delivery task. As part of the delivery task, the service robot is configured to determine or receive a route within the correctional facility and traverse the route to receive and deliver an item for delivery. The item for delivery can be, for example, an item from the correctional facility commissary, a mail item, a clothing item, an audio or video message, or even an inmate or person.

To perform the delivery task, the service mobile correctional facility robot can include a plurality of actuators for controlling movement of the various mechanical components of the robot, such as wheels, an arm or shelf, a gripping instrument, and a compartment door, for example. The service robot can further include a sensor array with various sensors for detecting physical properties of the environment surrounding the robot and an output interface for providing audio or visual output to one or more people in the environment surrounding the robot.

In another embodiment, an enforcement mobile correctional facility robot is configured to perform an enforcement task. As part of the enforcement task, the enforcement robot is configured to determine or receive a route within the correctional facility, traverse the route to arrive at a location in which an enforcement action is to be performed, and perform the enforcement action.

To perform the enforcement action, the enforcement mobile correctional facility robot can include a plurality of actuators for controlling movement of the various mechanical components of the robot, such as wheels and an arm to deploy non-lethal force as part of the enforcement action, for example. The non-lethal force can include the use of an electro-shock weapon, a rubber projectile gun, gas, or physical contact by the robot with an inmate. The enforcement robot can further include a sensor array with various sensors for detecting physical properties of the environment surrounding the robot and an output interface for providing audio or visual output to one or more people in the environment surrounding the robot.

In yet another embodiment, one or both of the service and enforcement mobile correctional facility robots can be configured to perform an additional monitoring task. As part of the monitoring task, the mobile correctional facility robots are configured to determine or receive a route within the correctional facility and monitor sensory data collected while traversing the route for events of interest. The mobile correctional facility robots can then transmit an alert to a detected event and/or react to the event.

These and other features of the present disclosure are described further below.

2. Example Operating Environment

FIG. 1 illustrates a floor plan 100 of an example correctional facility in which mobile correctional facility robots can operate in accordance with embodiments of the present disclosure. It should be noted that floor plan 100 is only exemplary and, in other embodiments, floor plan 100 can include a larger number of rooms with additional and/or different purposes than those shown and can have multiple levels of floors.

Floor plan 100 includes several inmate cells 102. Each inmate cell 102 can be designated to one or more inmates for the general purpose of sleeping and can include a bed and lavatory. Inmate cells 102 can be separated from the rest of the correctional facility by a solid or barred wall and a solid or barred door that locks from the outside to confine the inmate at any given point in time.

Floor plan 100 further includes a control room 104 that functions as a space where the correctional facility can be monitored and controlled by correctional facility guards and other employees of the correctional facility. Control room 104 can include one or more surveillance system monitors and control systems from which feeds from surveillance video cameras and microphones spaced throughout the correctional facility can be monitored and controlled. Control room 104 can further include a control system to open and shut doors and gates throughout the correctional facility and a control system in which phone calls to and from the correctional facility are routed.

Other rooms in floor plan 100 include a commissary 106, from which inmates can purchase hygiene items, food items, writing or drawing related items, and/or other items using money in an account maintained by the correctional facility or some other entity, a kitchen 108 where meals are prepared for the inmates, a laundry room 110 for doing inmate laundry, a storage and/or mail room 112, offices/holding rooms/medical rooms 114, a multi-purpose room 116 used for exercise and other inmate activities, and showers 118 used for inmate bathing.

One or more mobile correctional facility robots 120 are configured to operate in the correctional facility depicted by floor plan 100. Mobile correctional facility robots 120 are configured to perform tasks traditionally assigned to correctional facility guards to help reduce the number of guards needed in the correctional facility.

Mobile correctional facility robots 120 can include several different types of robots with different capabilities and physical characteristics, including a service mobile correctional facility robot and an enforcement mobile correctional facility robot. Each type of mobile correctional facility robot 120 can work independently to execute a task, work together with other robots of the same type to execute a task, and/or work together with other robots of the same and differing types to execute a task.

When cooperation is employed among multiple mobile correctional facility robots 120 to execute tasks, a central controller 122 can be used to coordinate the efforts of the multiple robots 120 to improve the performance of the overall system of robots as compared to the performance of the robots 120 when working in uncoordinated effort to execute the tasks. Central controller 122, when employed, can be located in control room 104 and can be implemented using a processor executing computer program instructions stored on a memory. Central controller 122 can communicate with mobile correctional facility robots 120 using a wireless and/or wired transceiver. Central controller 122 can also be one of mobile correctional facility robots 120.

In one embodiment, one or more of correctional facility robots 120 are service mobile correctional facility robots configured to perform a delivery task. As part of the delivery task, a service robot is configured to determine or receive a route within the correctional facility and traverse the route to receive and deliver an item. The item for delivery can be, for example, an item from commissary 106, a mail item from storage/mail room 112, a clothing item from laundry 110, an audio or video message, and/or an inmate or person, to provide a few examples.

In another embodiment, one or more of correctional facility robots 120 are enforcement mobile correctional facility robots configured to perform an enforcement task. As part of the enforcement task, an enforcement robot is configured to determine or receive a route within the correctional facility, traverse the route to arrive at a location in which an enforcement action is to be performed, and perform the enforcement action.

In yet another embodiment, one or more of correctional facility robots 120 configured as service or enforcement mobile correctional facility robots can be configured to perform an additional monitoring task. As part of the monitoring task, a mobile correctional facility robot is configured to determine or receive a route within the correctional facility and monitor sensory data collected while traversing the route for events of interest. The correctional facility robot can then transmit an alert to a detected event and/or react to the event.

3. Mobile Correctional Facility Robots

Figure 2:
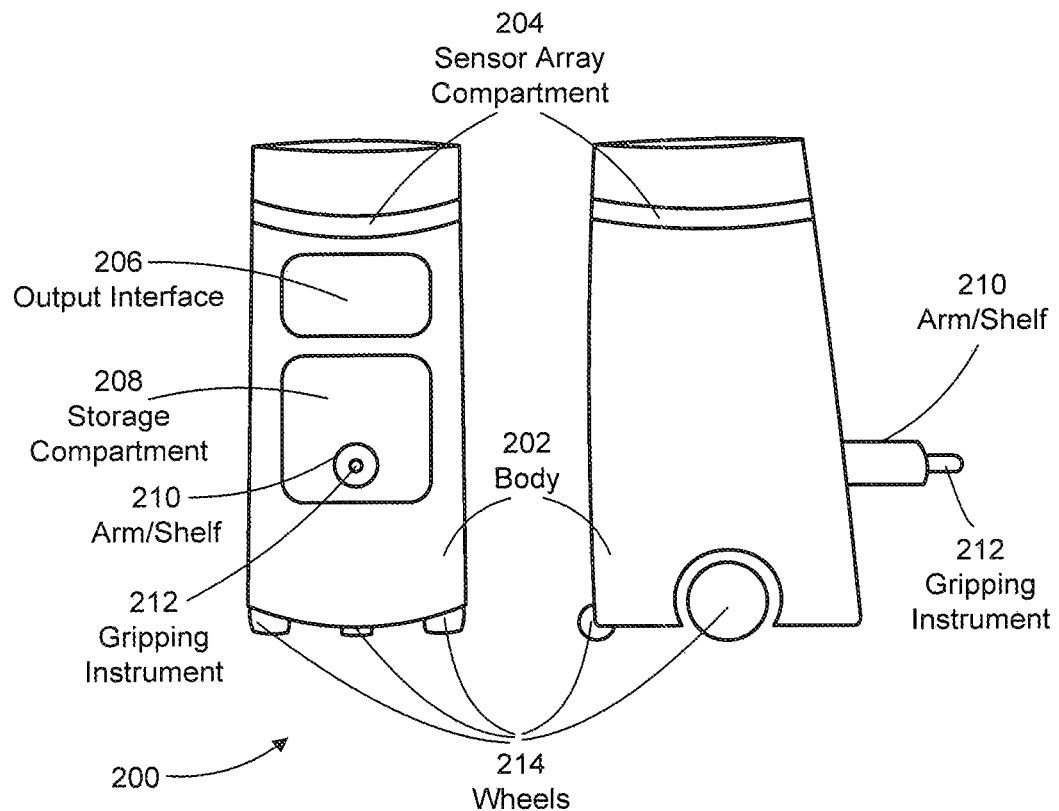
FIG. 2 illustrates a front-facing and profile view of an example mobile correctional facility robot in accordance with embodiments of the present disclosure.

Referring now to FIG. 2, an example front view and profile view of a mobile correctional facility robot 200 is illustrated in accordance with embodiments of the present disclosure. In one embodiment, mobile correctional facility robot 200 corresponds to one or more of mobile correctional facility robots 120 in FIG. 1. As shown in FIG. 2, mobile correctional facility robot 200 includes a body 202, a sensor array compartment 204, an output interface 206, a storage compartment 208, an arm or shelf 210, a gripping instrument 212, and wheels 214. It should be noted that mobile correctional facility robot 200 is exemplary and in other embodiments one or more of the components and instruments shown in FIG. 2 can be dispensed with and/or additional components and instruments can be used.

Body 202 can be made of several different types of materials depending on the tasks that mobile correctional facility robot 200 is configured to execute. For example, assuming mobile correctional facility robot 200 is a service robot configured to deliver items, body 202 can be made of a cheap and/or lightweight material, such as injection molded and/or vacuum formed plastic. On the other hand, assuming mobile correctional facility robot 200 is an enforcement robot configured to perform an enforcement action, body 202 can be made of a stronger material, such as metal. Sensor array compartment 204 can be covered by a plexiglass material (or other clear or semi-clear material) and/or a perforated material to allow sensor signals to be transmitted and received by sensors and detectors contained in sensor array compartment 204. Similarly, output interface 206 can be covered by a plexiglass material (or other clear or semi-clear material) and/or a perforated material to allow audio and/or visual output provided by output interface 206 to be heard or seen by people in the surrounding environment of mobile correctional facility robot 200.

Sensor array compartment 204, as noted above, includes sensors and detectors. Although sensor array compartment 204 is shown as a single compartment that extends around the entire width of body 202, sensor array compartment 204 can be positioned at one or more other points and locations of body 202. Sensor array compartment 204 can include, for example, sensors to help aid in performing various functions of the mobile correctional facility robot 200, such as navigating through the correctional facility, manipulating objects (e.g., items for delivery or non-lethal means of force), and monitoring inmate activity. The sensors for each of these functions can be shared among the different functions and/or used for other functions not specifically mentioned here.

To perform navigation in the correctional facility, sensor array compartment 204 can include one or more distance and/or contour sensors, such as ultrasonic sensors, infrared sensors, laser range sensors, stereo camera sensors, and Light Detection and Ranging technology (LIDAR) sensors. In addition, to perform navigation in the correctional facility, sensor array compartment 204 can include a compass, an accelerometer, a global positioning system sensor to detect satellite signals, and an indoor localization system sensor that senses or receives signals from landmarks or beacons the generate Wi-Fi, Bluetooth, or any other similar signal within the correctional facility.

To manipulate and hold objects, such as items for delivery or non-lethal means of force, one or more pressure or tactile sensors can be used. These sensors are positioned on the components of mobile correctional facility robot 200 responsible for manipulating and holding the objects, such as arm or shelf 210 and gripping instrument 212.

To monitor inmate activity, sensory array compartment 204 can include microphones and various types of image sensors. For example, a microphone array can be included in sensor array compartment 204 to perform sound source localization using the information from the multiple microphones in the array. In addition, multiple video cameras can be positioned around body 202 to provide mobile correctional facility robot 200 with a wide view of its surrounding environment, including a 360 degree view. The cameras can include thermographic and infrared cameras, which can be used to monitor inmates behind walls or other objects and in dark environments.

Finally, other sensors can be included in sensor array compartment 204 to monitor other physical properties and characteristics of the environment surrounding mobile correctional facility robot 200, such as temperature sensors and biometric sensors. Biometric sensors can be used, for example, to authenticate an inmate or another person and/or to authorize an inmate or another person to perform an activity. Biometric sensors can include finger print scanners, iris scanners, microphones to perform voice identification, and/or image sensors to perform facial identification. Additionally, biometric sensors can include a radio-frequency identification (RFID) or near-field communication (NFC) transceiver or receiver to receive identification signals from inmates' wireless communication devices, such a tablets, phones, or wearable devices (e.g., a bracelet worn on the ankle or wrist). Each identification signal can uniquely identify an inmate.

Output interface 206 can include one or more displays, lights, and speakers to provide audio and visual output to people in the environment surrounding mobile correctional facility robot 200. In one embodiment, mobile correctional facility robot 200 can include hardware and software that allow mobile correctional facility robot 200 to have intelligent and realistic communications with inmates and guards of the correctional facility. This capability of mobile correctional facility robot 200 can be used to take orders from inmates or guards (e.g., orders for goods from the correctional facility commissary), to answer general questions of inmates or guards, or to relay electronic messages between inmates and guards or between guards.

Output interface 206 can also include a detachable phone or tablet that can be used by inmates to communicate with mobile correctional facility robot 200 as well as to place phone and/or video calls to individuals outside of the correctional facility, such as friends and families. The phone or tablet can use an existing wireless infrastructure in the prison facility to provide such services and can be powered or charged by a battery of mobile correctional facility robot 200 through a wire, a wireless charging base on mobile correctional facility robot 200, or a contact based charger on mobile correctional facility robot 200.

Storage compartment 208 can be used to store items and objects that are not currently being used or are not currently needed by mobile correctional facility robot 200. For example, storage compartment 208 can be used to store items for delivery and/or means for non-lethal force, such as an electro-shock weapon, a rubber projectile gun, or gas stored in a container. Storage compartment 208 can also be used to store the phone or tablet mentioned above.

Arm or shelf 210 can be used to manipulate or hold an object, such as items for delivery or non-lethal means of force, and can include one or more components that allow arm or shelf 210 to be extended from body 202 and articulated in one or more other directions. Although shown as coming out of storage compartment 208, in other embodiments arm or shelf 210 can be attached to other parts of body 202, such as one of the sides of body 202. Gripping instrument 212 can be used to grip or pinch an object using two or more fingers or digits. Gripping instrument 212 can be attached to the end of arm or shelf 210 as shown in FIG. 2.

Wheels 214 are used to move mobile correctional facility robot 200 around the correctional facility. As shown in FIG. 2, mobile correctional facility robot 200 includes three wheels: two towards the front and one towards the back of mobile correctional facility robot 200. In other embodiments, more or less wheels 214 can be used and at different positions than those shown in FIG. 2.

Although not specifically shown in FIG. 2, mobile correctional facility robot 200 can include one or more batteries or battery cells internal to body 202 for powering mobile correctional facility robot 200. Mobile correctional facility robot 200 can monitor the charge state of the one or more batteries and determine the amount of charge needed to return to a home base or charging base from its current position. Mobile correctional facility robot 200 can return to the home base or charging base before the charge of the batteries becomes too low to make the trip back to the home base or charging base. The home base or charging base can contain a beacon that transmits a wireless signal to mobile correctional facility robot 200. Mobile correctional facility robot 200 can use the wireless signal to position itself such that charging contacts on mobile correctional facility robot 200 make contact with charging contacts on the home base or charging base. The home base or charging base can transfer power through the contacts to the batteries of mobile correctional facility robot 200.

Figure 3:
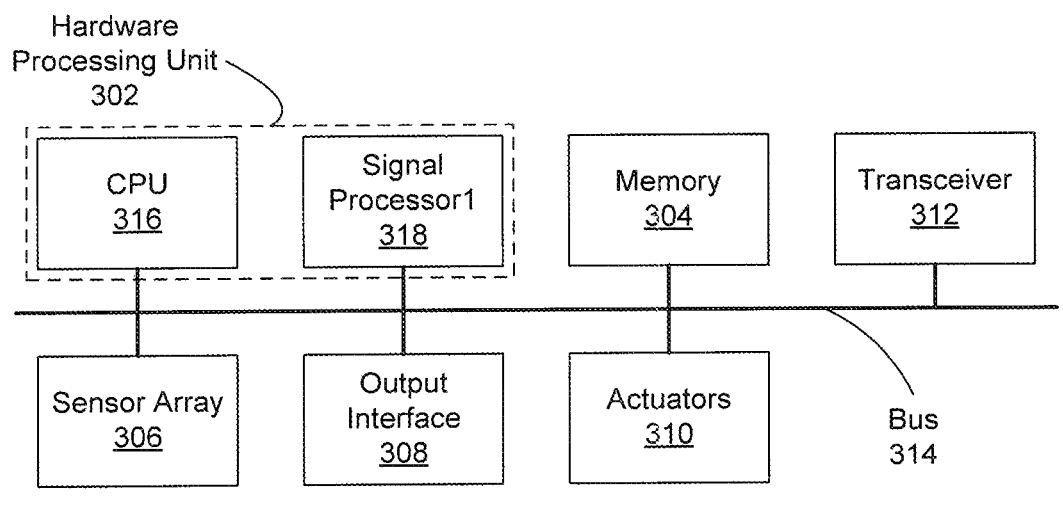
FIG. 3 illustrates a block diagram of an example correctional facility robot in accordance with embodiments of the present disclosure.

Referring now to FIG. 3, a block diagram of an example correctional facility robot, such as correctional facility robot 200 in FIG. 2, is illustrated in accordance with embodiments of the present disclosure. Block diagram 300 includes a hardware processing unit 302, a memory 304, a sensor array 306, an output interface 308, actuators 310, a transceiver 312, and a bus 314.

Hardware processing unit 302 can include one or more processors, such as a central processing unit (CPU) 316 and a signal processor 318 (e.g., a digital signal processor or a graphics processing unit). Hardware processing unit 302 can be used to execute computer program instructions stored in memory 304. The computer program instructions can relate to or include one or more functions of mobile correctional facility robot 200 described above and one or more methods described below with respect to FIGS. 4-6.

Memory 304 can store, in addition to computer program instructions, sensor data collected by sensors in sensor array 306. The sensor data corresponds to physical properties of the environment surrounding the mobile correctional facility robot. Sensory array 306 can include one or more of the sensors described above in regard to FIG. 2 and can be used for the same or similar purposes.

Output interface 308 can include one or more displays, lights, and speakers to provide audio and visual output to people in the environment surrounding the mobile correctional facility robot. Hardware processing unit 302 can generate or provide the audio and visual output to output interface 308 over bus 314 or some other connection not shown.

Actuators 310 can control the movement of the various mechanical components of the robot at the direction of hardware processing unit 302, such as wheels and an arm to handle items for delivery or to deploy non-lethal force as part of the enforcement action, for example. The actuators can include one or more electric actuators, such as motors, mechanical actuators, hydraulic actuators, and pneumatic actuators.

Finally, transceiver 312 can be used to communicate information and data from the mobile correctional facility robot that transceiver 312 is implemented to other mobile correctional facility robots and/or to a central controller, such as central controller 122 illustrated in FIG. 1. Hardware processing unit 302 can provide the information to be communicated to transceiver 312 over bus 314 or some other connection not shown.

Although not shown in FIG. 3, it should be noted that block diagram 300 can further include one or more input interfaces to allow the mobile correctional facility robot to receive input from inmates or guards of the correctional facility. For example, the one or more input interfaces can include a keyboard, touch interface, buttons, or switches.

4. Coordination Method

Figure 4:
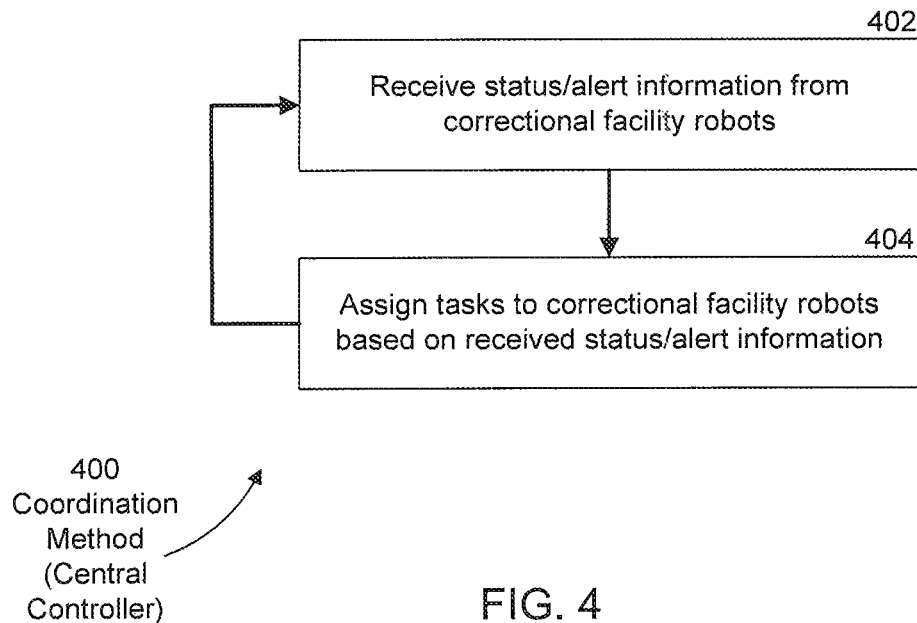
FIG. 4 illustrates a flowchart of an example coordination method performed by a central controller is a cooperative correctional facility robot system in accordance with embodiments of the present disclosure.

Referring now to FIG. 4, a flowchart of a coordination method 400 for execution by central controller 122 in FIG. 1 is illustrated in accordance with embodiments of the present disclosure. As discussed above, mobile correctional facility robots 120 in FIG. 1 can include several different types of robots with different capabilities and physical characteristics, including a service mobile correctional facility robot and an enforcement mobile correctional facility robot. Each type of mobile correctional facility robot 120 can work independently to execute a task, work together with other robots of the same type to execute a task, and/or work together with other robots of the same and differing types to execute a task.

When cooperation is employed among multiple mobile correctional facility robots 120 to execute tasks, central controller 122 can be used to coordinate the efforts of the multiple robots 120 to improve the performance of the overall system of robots as compared to the performance of robots 120 when working in an uncoordinated effort to execute the tasks.

To this end, coordination method 400 begins at step 402, where central controller 122 receives status and/or alert information from one or more of correctional facility robots 120. Status information can include, for example, the current position of a mobile correctional facility robot, a current task or tasks that the correctional facility robot is executing, a delivery order received from an inmate for a commissary item or some other item, and/or alert information regarding an event of interest recognized by the correctional facility robot in sensor data. Events of interest can include words or phrases spoken by inmates or predetermined behavior that can be indicative of impending or ongoing dangerous or illicit behavior, such as violence or an attempted suicide.

After receiving the status and/or alert information at step 402 (or concurrently with receiving the status and/or alert information at step 402), method 400 proceeds to step 404. At step 404, central controller 122 can assign tasks to one or more of mobile correctional facility robots 120 based on the status and/or alert information received at step 402.

For example, based on status information received from one of mobile correctional facility robots 120 regarding a delivery request from an inmate for an item, central controller 122 can assign the task of picking up and delivering the item from its current location (e.g., commissary 106) to another one of mobile correctional facility robots 120. Central controller 122 can specifically assign the delivery task to one of mobile correctional facility robots 120 based on the current location of mobile correctional facility robots 120 in the correctional facility received at step 402 relative to the pickup location of the item to be delivered.

In another example, central controller 122 can assign a monitoring task to one or more correctional facility robots 120 based on their current task loads or current locations. For example, for ones of correctional facility robots 120 that reported status information indicating that the robots have no or few current tasks to execute, central controller 122 can assign those robots to a monitoring task to monitor inmate behavior and provide alerts to any events of interest.

In yet another example, central controller 122 can assign one of the enforcement type mobile correctional facility robots from among mobile correctional facility robots 120 to perform an enforcement task based on alert information received from another one of mobile correctional facility robots 120. The alert information, as described above, pertains to an event of interest recognized by a mobile correctional facility robot in the sensor data that it collects. Events of interest can include words or phrases spoken by an inmate or predetermined behavior that is indicative of impending or ongoing dangerous or illicit behavior, such as violence or an attempted suicide. Central controller 122 can assign the enforcement type mobile correctional facility robot to perform an enforcement action using non-lethal force to prevent or stop the dangerous or illicit behavior. The enforcement type mobile correctional facility robot can deploy the non-lethal force autonomously, at the direction of central controller 122, or at the remote direction of a human operator, such as a guard.

Figure 5:
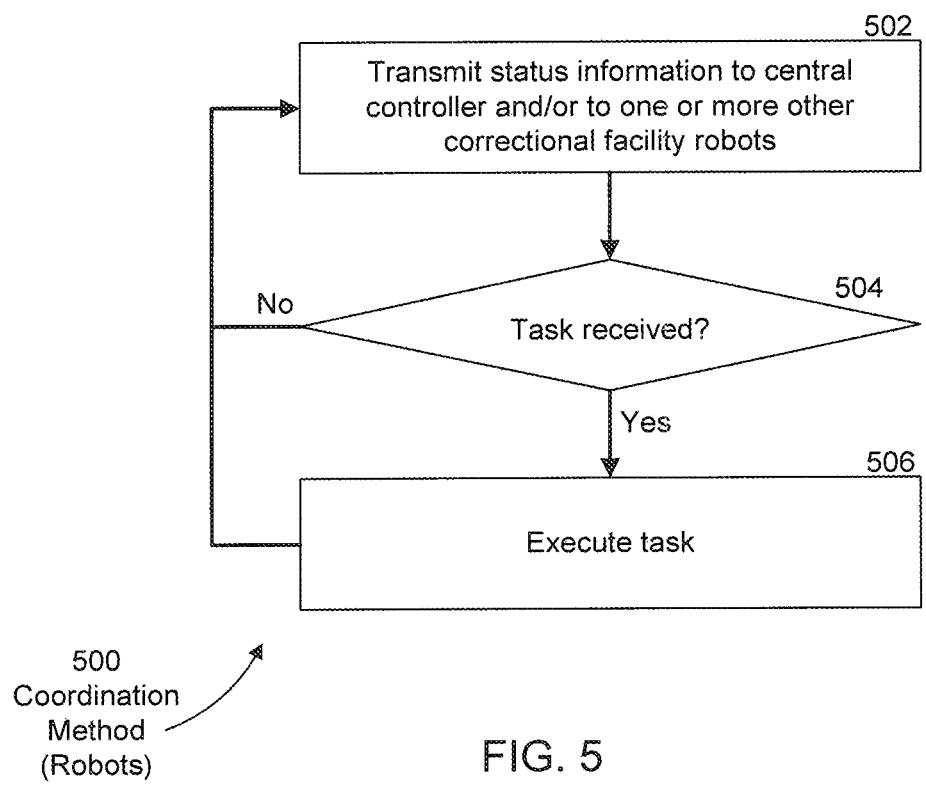
FIG. 5 illustrates a flowchart of an example coordination method performed by a mobile correctional facility robot is a cooperative correctional facility robot system in accordance with embodiments of the present disclosure.

FIG. 5 illustrates a flowchart of a coordination method 500 for execution by a mobile correctional facility robot 120 in FIG. 1 in accordance with embodiments of the present disclosure. Coordination method 500 is intended to work in conjunction with coordination method 400, implemented by central controller 122, to coordinate the efforts of multiple mobile correctional facility robots 120.

Coordination method 500 begins at step 502. At step 502, mobile correctional facility robot 120 transmits status and/or alert information to central controller 122 and/or to one or more other mobile correctional facility robots 120. Different types of status and alert information were described above in regard to FIG. 4.

After step 502, method 500 proceeds to step 504. At step 504, mobile correctional facility robot 120 determines whether a task has been received from central controller 122. If no task has been received from central controller 122, method 500 proceeds back to step 502. On the other hand, if a task has been received from central controller 122, method 500 proceeds to step 506.

At step 506, mobile correctional facility robot 120 executes the task(s) that it has received from central controller 122.

It should be noted that two or more of steps 502, 504, and 506 can execute concurrently in other embodiments.

5. Task Execution Method

Figure 6:
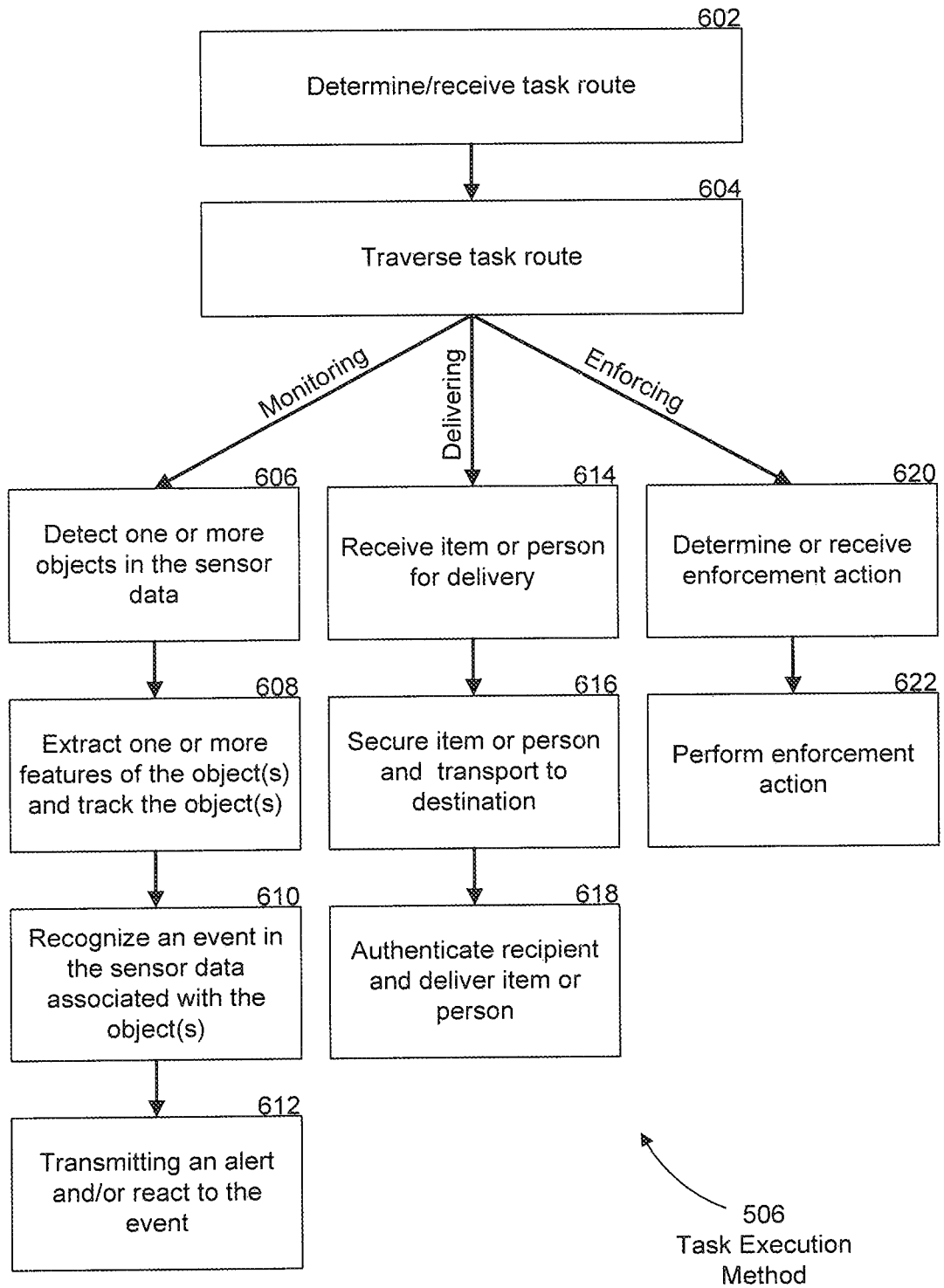
FIG. 6 illustrates a flowchart of an example method for executing a task by a mobile correctional facility robot in accordance with embodiments of the present disclosure.

Referring now to FIG. 6, a flowchart of a method for performing the task execution step 506 in FIG. 5 is illustrated. Method 506 is performed by a mobile correctional facility robot 120 in FIG. 1 to execute an assigned task. It should be noted that method 506 can be performed as part of a multi-robot coordination scheme, as shown in FIG. 5, or in instances where a multi-robot coordination scheme is not used.

Method 506 begins as step 602. At step 602, the mobile correctional facility robot 120, performing method 506, determines or receives a route within the correctional facility to execute the task. For example, the route can be provided by central controller 122 when mobile correctional facility robot 120 is operating as part of a multi-robot coordination scheme or mobile correctional facility robot 120 can independently determine the route.

After step 602, method 506 proceeds to step 604, where mobile correctional facility robot 120 begins to traverse the received or determined route from step 602. Step 604 can proceed concurrently with one or more of the remaining steps in method 506.

After step 604 (or concurrently with step 604), method 506 proceeds down one of several different paths based on the task that mobile correctional facility robot 120 is currently executing. For example, as shown in FIG. 5, method 506 can proceed down a monitoring path if the task is for performing a monitoring operation, a delivering path if the task is for performing a delivery operation, or an enforcing path if the task is for performing an enforcement operation. It should be noted that method 506 can be adapted to include more or less paths based on the task execution capabilities of mobile correctional facility robot 120 performing method 506.

Assuming that the task currently being executed by mobile correctional facility robot 120 is a monitoring task, method 506 proceeds to step 606. At step 606, video frames of a video stream captured by an image sensor of mobile correctional facility robot 120 are analyzed to detect an object. For example, moving objects and/or people in the video captured by the video stream can be detected using one or more known methods for detecting moving objects and/or people in video. In addition or alternatively, audio segments of an audio stream captured by a microphone of mobile correctional facility robot 120 are analyzed to detect objects, such as words or phrases.

After step 606, method 506 proceeds to step 608. At step 608, features of the detected object in the video stream or the audio stream can be extracted for recognition and/or classification using one or more known methods. For example, if the detected object in the video stream is a weapon or an inmate, the weapon or inmate can be extracted and recognized as a particular weapon or inmate, or classified as a weapon or inmate. Similar, a detected word or phrase in the audio stream can be recognized as a particular word or phrase or classified as a particular word or phrase, such as those indicating violence or the potential for violence. In addition to extracting features of the detected object in step 608, a detected object in the video stream can be tracked using one or more known methods. Tracking a detected object can include tracking the position and speed of the object.

After step 608, method 506 proceeds to step 610. At step 610, mobile correctional facility robot analyzes the video and/or audio stream to detect the occurrence of an event that is associated with the one or more detected objects. For example, the event can be impending or ongoing dangerous or illicit behavior, such as violence or an attempted suicide. Events can be detected using, for example, well known rule-based or learning-based (e.g., machine learning or deep learning) event detection techniques. The event can correspond to predetermined behavior or predetermined words or phrases.

After step 610, method 506 proceeds to step 612. At step 612, mobile correctional facility robot 120 can transmit an alert of the occurrence of the event recognized at step 610 and/or can react to the event. For example, if mobile correctional facility robot 120 is a service type mobile correctional facility robot described above, mobile correctional facility robot 120 can transmit the alert to central controller 122 to dispatch an appropriately equipped and capable mobile correctional facility robot 120 to respond to the event, such as an enforcement type mobile correctional facility robot described above. Or, if mobile correctional facility robot 120 is appropriately equipped and capable of responding to the event (e.g., where mobile correctional facility robot 120 is an enforcement type mobile correctional facility robot), mobile correctional facility robot 120 can itself respond to the event without first transmitting an alert to the event to central controller 122 or to some other entity.

Referring back to step 604 of method 506, assuming that the task currently being executed by mobile correctional facility robot 120 is a delivery task, method 506 proceeds to step 614. At step 614, mobile correctional facility robot 120 receives an item or person (e.g., an inmate) for delivery. The item for delivery can be, for example, an item from commissary 106, a mail item from storage/mail room 112, a clothing item from laundry 110, and/or an audio or video message, to provide a few examples. The item can also be a person, such as an inmate, who is to be delivered to a particular location in the correctional facility, such as the kitchen 108, medical room 114, showers 118, etc. For example, an inmate may need to be delivered to medical room 114 for an exam or a visitation room to meet with a visitor. Mobile correctional facility robot 120 can authenticate the inmate to be delivered before transporting the inmate. Where the item is an item from commissary 106 requested by an inmate, mobile correctional facility robot 120 can verify that the inmate has sufficient funds in an account maintained by the correctional facility or some other entity to pay for the item.

After step 614, method 506 proceeds to step 616. At step 616, the item or person to be delivered can be secured. For example, mobile correctional facility robot can store the item in a storage compartment, such as compartment 208 in FIG. 2. The item for delivery can also be a voice or video message from a person in the correctional facility. In such an instance, the voice or video message can be stored electronically in a memory of mobile correctional facility robot. If a person is to be delivered, mobile correctional facility robot 120 can chain the person in some manner to the body of mobile correctional facility robot 120. After the item or person is secure, mobile correctional facility robot 120 can then transport the item or person to the delivery destination.

After step 616, method 506 proceeds to step 618. At step 618, mobile correctional facility robot 120 can authenticate the recipient of the item or person before completing the delivery. For example, for an item order from commissary 106 by an inmate, mobile correctional facility robot 120 can authenticate the inmate before delivering the item to the inmate. Mobile correctional facility robot 120 can perform the authentication using one or more biometric sensors as discussed above. Where the item for delivery is an electronic message, encryption can be used to authenticate the recipient of the electronic message.

Referring back to step 604 of method 506, assuming that the task currently being executed by mobile correctional facility robot 120 is an enforcement task, method 506 proceeds to step 620. At step 620, mobile correctional facility robot 614 determines or receives an enforcement action. For example, the enforcement action can be to deploy non-lethal force to prevent or stop the dangerous or illicit behavior, such as violence between inmates or a suicide attempt of an inmate. The non-lethal force can include the use of an electro-shock weapon, a rubber projectile gun, gas, or physical contact by the robot with an inmate.

After step 620, method 506 proceeds to step 622. At step 622, mobile correctional facility robot 120 performs the enforcement action autonomously, at the direction of central controller 122, or at the remote direction of a human operator, such as a guard. A human operator or guard can remotely control mobile correctional facility robot 120 through central controller 122 or through some other device.

It should be noted that, in some embodiments, steps 606-612 for performing a monitoring task can be executed in parallel with either steps 614-618 for performing a delivery task or steps 620-622 for performing an enforcement task.

6. Example Computer System Environment

It will be apparent to persons skilled in the relevant art(s) that various elements and features of the present disclosure, as described herein, can be implemented in hardware using analog and/or digital circuits, in software, through the execution of instructions by one or more general purpose or special-purpose processors, or as a combination of hardware and software.

Figure 7:
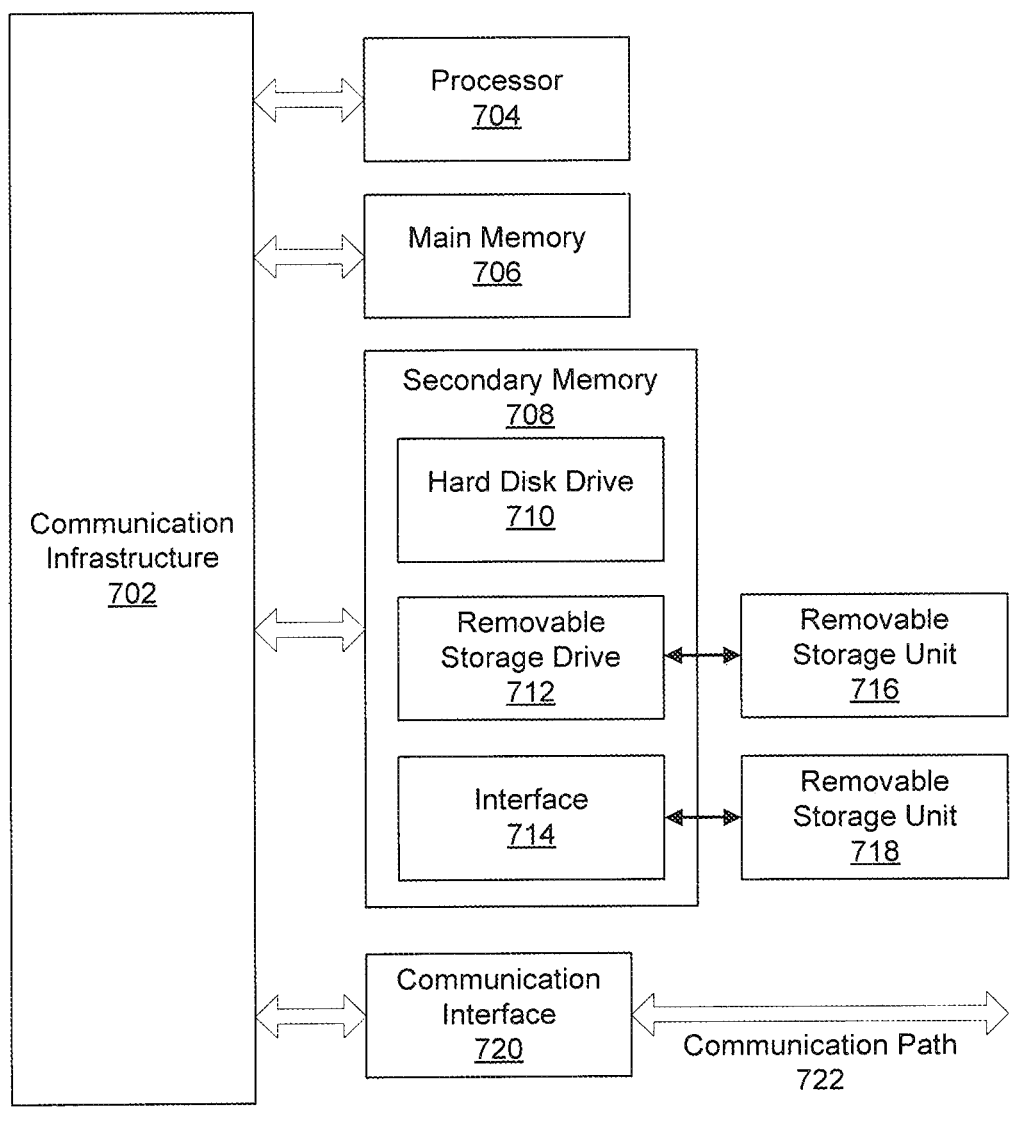
FIG. 7 illustrates a block diagram of an example computer system that can be used to implement aspects of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. An example of such a computer system 700 is shown in FIG. 7. Each of the steps of the methods depicted in FIG. 4, FIG. 5, and FIG. 6 can be implemented on one or more computer systems 700.

Computer system 700 includes one or more processors, such as processor 704. Processor 704 can be a special purpose or a general purpose digital signal processor. Processor 704 is connected to a communication infrastructure 702 (for example, a bus or network). Various software implementations are described in terms of this exemplary computer system. After reading this description, it will become apparent to a person skilled in the relevant art(s) how to implement the disclosure using other computer systems and/or computer architectures.

Computer system 700 also includes a main memory 706, preferably random access memory (RAM), and may also include a secondary memory 708. Secondary memory 708 may include, for example, a hard disk drive 710 and/or a removable storage drive 712, representing a floppy disk drive, a magnetic tape drive, an optical disk drive, or the like. Removable storage drive 712 reads from and/or writes to a removable storage unit 716 in a well-known manner. Removable storage unit 716 represents a floppy disk, magnetic tape, optical disk, or the like, which is read by and written to by removable storage drive 712. As will be appreciated by persons skilled in the relevant art(s), removable storage unit 716 includes a computer usable storage medium having stored therein computer software and/or data.

In alternative implementations, secondary memory 708 may include other similar means for allowing computer programs or other instructions to be loaded into computer system 700. Such means may include, for example, a removable storage unit 718 and an interface 714. Examples of such means may include a program cartridge and cartridge interface (such as that found in video game devices), a removable memory chip (such as an EPROM, or PROM) and associated socket, a thumb drive and USB port, and other removable storage units 718 and interfaces 714 which allow software and data to be transferred from removable storage unit 718 to computer system 700.

Computer system 700 may also include a communications interface 720. Communications interface 720 allows software and data to be transferred between computer system 700 and external devices. Examples of communications interface 720 may include a modem, a network interface (such as an Ethernet card), a communications port, a PCM-CIA slot and card, etc. Software and data transferred via communications interface 720 are in the form of signals which may be electronic, electromagnetic, optical, or other signals capable of being received by communications interface 720. These signals are provided to communications interface 720 via a communications path 722. Communications path 722 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 716 and 718 or a hard disk installed in hard disk drive 710. These computer program products are means for providing software to computer system 700.

Computer programs (also called computer control logic) are stored in main memory 706 and/or secondary memory 708. Computer programs may also be received via communications interface 720. Such computer programs, when executed, enable the computer system 700 to implement the present disclosure as discussed herein. In particular, the computer programs, when executed, enable processor 704 to implement the processes of the present disclosure, such as any of the methods described herein. Accordingly, such computer programs represent controllers of the computer system 700. Where the disclosure is implemented using software, the software may be stored in a computer program product and loaded into computer system 700 using removable storage drive 712, interface 714, or communications interface 720.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

7. Conclusion

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A method for coordinating a plurality of mobile correctional facility robots comprising a first mobile correctional facility robot, a second mobile correctional facility robot, a third mobile correctional facility robot, and a fourth mobile correctional facility robot in a correctional facility, the method comprising:
   receiving first status information from the first mobile correctional facility robot, wherein the first mobile correctional facility robot is of a first type and wherein the status information is associated with a task to be performed;
   identifying, based on the first status information, the second mobile correctional facility robot, wherein the second mobile correctional facility robot is of a second type;
   assigning, to the second mobile correctional facility robot, the task to be performed;
   receiving second status information from the third mobile correctional facility robot;
   receiving third status information from the fourth mobile correctional facility robot, wherein the third status information is associated with a second task to be performed; and
   assigning, based on the second status information, the second task to the third mobile correctional facility robot.

2. The method of claim 1, further comprising:
   assigning, to the first mobile correctional facility robot and the second mobile correctional facility robot, a third task, wherein the third task is a monitoring task of a particular area within the correctional facility; and
   receiving, from the first mobile correctional facility robot or the second mobile correctional facility robot, an alert associated with the monitoring task.

3. The method of claim 1, wherein the first status information comprises sensor data of the first mobile correctional facility robot indicating an event of interest within the correctional facility.

4. The method of claim 3, wherein the event of interest comprises at least one of a predetermined spoken word or phrase detected by the first mobile correctional facility robot or a predetermined behavior detected by the first mobile correctional facility robot.

5. The method of claim 4, further comprising:
   directing the second mobile correctional facility robot to deploy non-lethal force as part of executing the task.

6. The method of claim 3, wherein the sensor data comprises information regarding an object detected by the first mobile correctional facility robot and the event of interest is recognized based on the detected object.

7. The method of claim 1, wherein the second status information comprises a current location of the third mobile correctional facility robot, the third status information comprises a delivery order received from an inmate of the correctional facility, and the second task is a delivery task associated with the delivery order.

8. The method of claim 7, wherein the second task is assigned based on the current location of the third mobile correctional facility robot.

9. The method of claim 1, wherein the first type is a monitoring type and the second type is an enforcement type.

10. The method of claim 1, wherein the method is performed by a fifth mobile correctional facility robot of the plurality of mobile correctional facility robots.

11. A mobile central controller robot for operating within a correctional facility comprising:
a plurality of actuators, wherein the plurality of actuators is based on a type of the mobile central controller robot;
a sensor array;
a transceiver configured to communicate with a plurality of mobile correctional facility robots comprising a first mobile correctional facility robot, a second mobile correctional facility robot, a third mobile correctional facility robot, and a fourth mobile correctional facility robot;
a memory comprising computer program instructions; and
a hardware processing unit configured to execute the computer program instructions to perform operations comprising:
receiving first status information from the first mobile correctional facility robot, wherein the first mobile correctional facility robot is of a first type and wherein the status information is associated with a task to be performed;
identifying, based on the first status information, the second mobile correctional facility robot, wherein the second mobile correctional facility robot is of a second type;
assigning, to the second mobile correctional facility robot, the task to be performed;
receiving second status information from the third mobile correctional facility robot;
receiving third status information from the fourth mobile correctional facility robot, wherein the third status information is associated with a second task to be performed; and
assigning, based on the second status information, the second task to the third mobile correctional facility robot.

12. The mobile central controller robot of claim 11, the operations further comprising:
assigning, to the first mobile correctional facility robot and the second mobile correctional facility robot, a third task, wherein the third task is a monitoring task of a particular area within the correctional facility; and
receiving, from the first mobile correctional facility robot or the second mobile correctional facility robot, an alert associated with the monitoring task.

13. The mobile central controller robot of claim 11, wherein the first status information comprises sensor data of the first mobile correctional facility robot indicating an event of interest within the correctional facility.

14. The mobile central controller robot of claim 13, wherein the event of interest comprises at least one of a predetermined spoken word or phrase detected by the first mobile correctional facility robot or a predetermined behavior detected by the first mobile correctional facility robot.

15. The mobile central controller robot of claim 14, the operations further comprising:
directing the second mobile correctional facility robot to deploy non-lethal force as part of executing the task.

16. The mobile central controller robot of claim 13, wherein the sensor data comprises information regarding an object detected by the first mobile correctional facility robot and the event of interest is recognized based on the detected object.

17. The mobile central controller robot of claim 11, wherein the second status information comprises a current location of the third mobile correctional facility robot, the third status information comprises a delivery order received from an inmate of the correctional facility, and the second task is a delivery task associated with the delivery order.

18. The mobile central controller robot of claim 17, wherein the second task is assigned based on the current location of the third mobile correctional facility robot.

19. A method for coordinating a plurality of mobile correctional facility robots comprising a first mobile correctional robot, a second mobile correctional facility robot, and a third mobile correctional facility robot, in a correctional facility, the method comprising:
receiving first status information from the first mobile correctional facility robot, wherein the first mobile correctional facility robot is of a first type and wherein the status information is associated with a task to be performed;
identifying, based on the first status information, the second mobile correctional facility robot and the third mobile correctional facility robot, wherein the second mobile correctional facility robot and the third mobile correctional facility robot are of a second type, wherein the second type are enforcement type robots; and
assigning, to the second mobile correctional facility robot and the third mobile correctional robot, the task to be performed.

20. The method of claim 19, wherein the status information comprises sensor data of the first mobile correctional facility robot indicating an event of interest within the correctional facility.

* * * * *